(12) United States Patent
Venkumahanti et al.

(10) Patent No.: US 9,122,486 B2
(45) Date of Patent: Sep. 1, 2015

(54) BIMODAL BRANCH PREDICTOR ENCODED IN A BRANCH INSTRUCTION

(75) Inventors: Suresh K. Venkumahanti, Austin, TX (US); Lucian Codrescu, Austin, TX (US); Stephen R. Shannon, Austin, TX (US); Lin Wang, Austin, TX (US); Phillip M. Jones, Austin, TX (US); Daisy T. Palal, Las Vegas, NV (US); Jiajin Tu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 12/941,105

(22) Filed: Nov. 8, 2010

(65) Prior Publication Data

US 2012/0117327 A1 May 10, 2012

(51) Int. Cl.
*G06F 9/30* (2006.01)
*G06F 9/38* (2006.01)

(52) U.S. Cl.
CPC .................... *G06F 9/3844* (2013.01)

(58) Field of Classification Search
None
See application file for complete search history.

(56) References Cited

U.S. PATENT DOCUMENTS

| 5,584,001 | A  | 12/1996 | Hoyt et al. |
| 5,878,255 | A  | 3/1999  | Tran et al. |
| 5,887,159 | A  | 3/1999  | Burrows |
| 7,461,243 | B2 | 12/2008 | Ali et al. |
| 7,587,580 | B2 | 9/2009  | Sartorius et al. |
| 7,752,426 | B2 | 7/2010  | Nye et al. |
| 2003/0126414 | A1 | 7/2003  | Grochowski et al. |
| 2004/0059899 | A1 | 3/2004  | Luick |
| 2007/0260862 | A1 | 11/2007 | McFarling |
| 2008/0005542 | A1 | 1/2008  | Gschwind |
| 2008/0040576 | A1 | 2/2008  | Stempel et al. |
| 2008/0072024 | A1 | 3/2008  | Davis et al. |
| 2010/0125720 | A1 * | 5/2010 | Sheng-Yuan ................ 712/205 |
| 2010/0169625 | A1 | 7/2010  | Wang et al. |
| 2013/0283023 | A1 | 10/2013 | Tabony et al. |

FOREIGN PATENT DOCUMENTS

| CN | 101427213 A | 5/2009 |
| CN | 101449238 A | 6/2009 |
| EP | 2063355 A1 * | 5/2009 |
| GB | 2389211 A | 12/2003 |
| JP | H1115659 A | 1/1999 |
| JP | 2001236266 A | 8/2001 |
| JP | 2009535750 A | 10/2009 |
| JP | 2009540412 A | 11/2009 |
| WO | 2007131032 A2 | 11/2007 |
| WO | WO2007141252 A1 | 12/2007 |

OTHER PUBLICATIONS

Loh et al., "Exploiting Bias in the Hysteresis Bit of 2-bit Saturating Counters in Branch Predictors", Jun. 2003.*

(Continued)

*Primary Examiner* — William B Partridge
(74) *Attorney, Agent, or Firm* — Peter Michael Kamarchik; Nicholas J. Pauley; Paul Holdaway

(57) ABSTRACT

Each branch instruction having branch prediction support has branch prediction bits in architecture specified bit positions in the branch instruction. An instruction cache supports modifying the branch instructions with updated branch prediction bits that are dynamically determined when the branch instruction executes.

22 Claims, 5 Drawing Sheets

(56) References Cited

OTHER PUBLICATIONS

N. Gloy, et al., "Performance Issues in Correlated Branch Presiction Schemes," Proc. 28th Annual IEEE/ACM Intl. Symp. On Microarchitecture, Nov. 1995, pp. 3-14.
Cheng, "The Schemes and Performances of Dynamic Branch predictors" EECS 252, Fall, 1995.
International Search Report and Written Opinion—PCT/US011/059658—ISA/EPO—Feb. 29, 2012.
Parikh, Dharmesh, et al., "Power Issues Related to Branch Prediction"; Proceedings of Eighth International Symposium on High-Performance Computer Architecture; 2002; pp. 1-12, IEEE.
Quinones E et al., "Improving Branch Prediction and Predicated Execution in Out-of-Order Processors", High Performance Computer Architecture, 2007. HPCA 2007. IEEE 13th International Symposium on, IEEE, PI, Feb. 1, 2007, pp. 75-84, XP031072896.
Taiwan Search Report—TW100140771—TIPO—Dec. 18, 2013.

* cited by examiner

BIMODAL BRANCH PREDICTOR ENCODED IN A BRANCH INSTRUCTION

FIELD OF THE INVENTION

The present invention relates generally to techniques to reduce power and implementation complexity and improve performance in a processing systems supporting branch prediction and, more specifically, to advantageous techniques for dynamically encoding branch prediction information in a branch instruction stored in a multi-level memory hierarchy.

BACKGROUND OF THE INVENTION

Many portable products, such as cell phones, laptop computers, personal digital assistants (PDAs) or the like, incorporate one or more processors executing programs that support communication and multimedia applications. The processors for such products conventionally have a hierarchical memory configuration with multi-levels of caches including an instruction cache, a data cache, and system memory. The processors also need to operate with high performance and efficiency to support the plurality of computationally intensive functions for such products. The processors are typically pipelined and support execution of conditional branch instructions.

The execution of a conditional branch instruction on a pipelined processor may stall the pipeline pending the determination of the condition. In order to avoid stalling the processor, some form of branch prediction is typically employed early in the pipeline allowing the processor to speculatively fetch and execute instructions based on a predicted branch behavior. If a conditional branch is mispredicted, the associated speculatively fetched instructions are flushed from the pipeline and new instructions are fetched from the determined branch address. Such misprediction reduces processor performance and increases power usage.

Conventional approaches to branch prediction are limited due to the implementation cost and complexity of branch prediction circuits, all of which consume power.

SUMMARY OF THE DISCLOSURE

Among its several aspects, the present invention recognizes a need for improved branch prediction capabilities that have a low implementation cost and reduce power usage. To such ends, an embodiment of the invention applies a method of storing bimodal branch predictor bits in a branch instruction in an instruction cache. A branch target address is predicted based on bimodal branch predictor bits stored in a branch instruction fetched from an instruction cache. A determination is made whether to change the bimodal branch predictor bits based on an evaluation of branch prediction accuracy in response to execution of the branch instruction. Bimodal branch predictor bits that have changed from the bimodal branch predictor bits in the fetched branch instruction are stored in the instruction cache.

Another embodiment of the invention addresses a branch prediction apparatus. An instruction cache is configured for storing and providing a branch instruction at an instruction fetch address, the branch instruction having bimodal branch predictor bits. Pipeline storage is configured for saving the instruction fetch address of the branch instruction. A prediction circuit is configured for determining whether to change the bimodal branch prediction bits based on an evaluation of a condition associated with the provided branch instruction. A write control logic circuit is configured for storing, in the branch instruction at the saved instruction fetch address in the instruction cache, the bimodal branch prediction bits that have changed from the bimodal branch prediction bits in the provided branch instruction.

Another embodiment of the invention addresses a method for bimodal branch prediction. Branch prediction bits associated with a conditional branch instruction are dynamically generated during execution. The dynamically generated branch prediction bits are stored in the conditional branch instruction in an instruction cache.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Practical Extraction and Reporting Language (PERL™), or in various other programming languages. A program written in one of these languages is compiled to a target processor architecture by converting the high level program code into a native assembler program. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
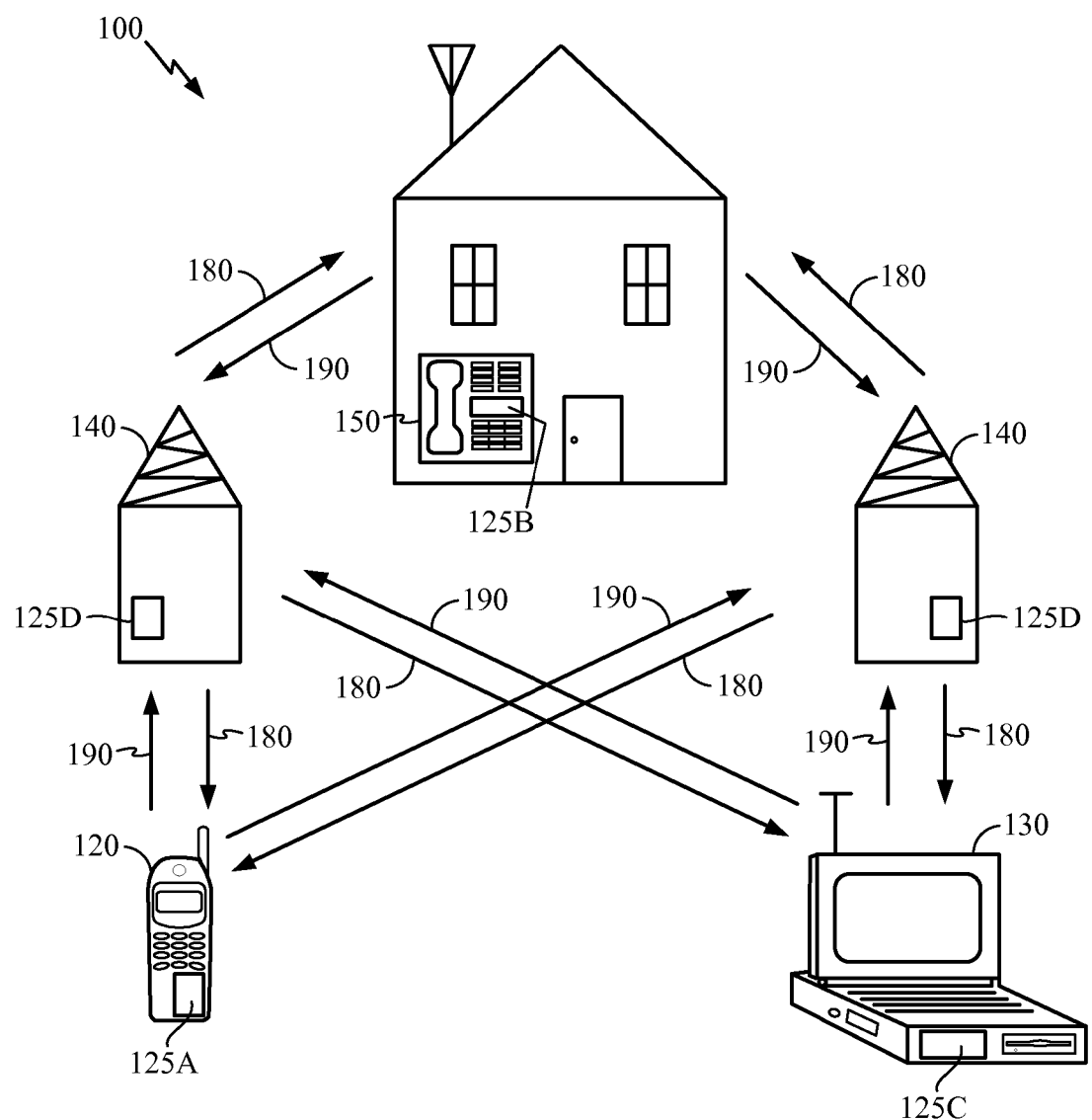
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system supporting branch prediction and supporting a memory hierarchy having caches.

Branch prediction techniques may include techniques for static and dynamic predictions. The likely behavior of some branch instructions can be statically predicted by a programmer and/or compiler. For example, a branch instruction may be statically predicted based on run-time attributes, such as loop exit evaluations which are branches to a previous address at the beginning of a loop. Such "backward" branches are usually predicted as taken to stay in the loop. The "backward" branches would be mispredicted when the loop is exited and the branch is not taken by falling through to the next instruction after the branch, thereby exiting the loop. It may also be determined for a particular program that "forward" branches are rarely taken. Hence, the "backward" branch may be statically predicted "taken," and the "forward" branch, statically predicted "not taken."

Dynamic prediction is generally based on an evaluation of a history of the behavior of a particular branch which is stored in a special branch history memory circuit. Analysis of programs generally indicates that recent past branch evaluation patterns may be a good indicator of the behavior of future branch instructions. As one example of a simple branch-history branch predictor, a plurality of one-bit flags may be maintained with each one-bit flag associated with an address of a conditional branch instruction. Each flag is set when an associated conditional branch evaluates "taken," and reset when it evaluates "not taken." The prediction of the next occurrence of the conditional branch may then simply be the value of the associated flag. For some branch instructions, this predictor may yield accurate predictions.

A design goal closely related to maximizing branch prediction accuracy is minimizing the adverse impact of erroneous branch predictions. Consider the "backward" branch condition described above and using a one-bit flag as a dynamic branch predictor. While the processor is in the loop, the branch is taken, and the associated flag remains a "one" each cycle through the loop and predicting "taken" for future executions of the "backward" branch instruction. When the loop is to be exited, the "backward" branch is mispredicted as "taken" and the wrong instructions are prefetched into the pipeline. The processor recovers from the erroneous branch prediction according to known branch misprediction recovery methods, while causing a loss of performance and wasting power. Due to this event, the associated one bit flag is reset to reflect the "not-taken" branch history. However, the next execution of the "backward" branch instruction would most likely be in the first cycle of the loop and the prediction based on the "not taken" flag would be incorrect. In this scenario, the single-bit branch evaluation history causes two mispredictions for each loop exit branch evaluation—one at the end of a loop exit and another at the next subsequent execution of the "backward" branch instruction in the first cycle of the loop.

One technique for minimizing the effect of a mispredicted branch evaluation is to weight a branch prediction by a confidence factor to indicate a strong or weak prediction. The confidence factor may be generated, for example, by a bimodal branch predictor that is based on a branch history represented by the state of a two-bit saturating counter. A separate counter or separate 2-bit history storage is required for each branch predicted using this technique. Each counter assumes one of four states, each representing a weighted prediction value, such as:

11—Strongly predicted taken
10—Weakly predicted taken
01—Weakly predicted not taken
00—Strongly predicted not taken The counter increments each time a corresponding conditional branch instruction evaluates "taken" and decrements each time the instruction evaluates "not taken", for example. An increment is a forward transition between two states moving in the direction toward the "strongly predicted taken" state and a decrement is a reverse transition between two states moving in the direction toward the "strongly predicted not taken" state. For example, an increment from the "01" weakly predicted not taken state is a forward transition to the "10" weakly predicted taken state. This incrementing/decrementing is "saturating," as incrementing stops at 0b11, and decrementing stops at 0b00. Thus, the branch prediction includes not only a taken or not taken prediction, as may be determined by examining the most significant bit (MSB) of the 2 bit saturating counter output, but also a weighting factor indicative of the strength or confidence of the prediction utilizing both bits of the counter value.

An alternative technique for implementing a bimodal branch predictor is based on a finite state machine. A separate finite state machine predictor is used for each branch predicted. The finite state machine predictor has four states, each representing a weighted prediction value, such as:

11—Strongly predicted taken
10—Weakly predicted taken
00—Weakly predicted not taken
01—Strongly predicted not taken The finite state machine predictor makes forward transitions between two states of the weighted prediction values "01"→"10"→"00"→"01", saturating at "11", depending upon the current state and whether the associated conditional branch instruction evaluates "taken". The finite state machine predictor makes reverse transitions between two states of the weighted prediction values "11"→"10"→"00"→"01", saturating at "00", depending upon the current state and whether the associated conditional branch instruction evaluates "not taken". With the finite state machine predictor, the most significant bit of the weighted prediction value is labeled the P bit and the least significant bit of the weighted prediction value is labeled the Q bit and represents the strength of the prediction.

A branch instruction such as the "backward" branch instruction considered above will only mispredict once with a bimodal branch predictor, rather than twice as with a single-bit flag predictor. The branch prediction at loop exit will move the predictor from "strongly taken" to "weakly taken." The actual prediction is bimodal, and is represented by the MSB of a bimodal predictor circuit which may be implemented as the associated 2-bit counter or finite state machine predictor described above. Hence, the next occurrence of the "backward" branch instruction will be predicted "taken," which is likely correct, and the predictor would move back to the "strongly taken" state. The binary value of the weighted prediction value determines the strength of the branch prediction confidence, with greater confidence at either end of the range, and lower confidence towards the middle of the range.

The cost of implementing such a bimodal prediction system is costly, requiring a branch history table or the like and means to associate a branch counter or a finite state machine predictor with an address of a branch instruction. For support of large programs, where a branch instruction may be encountered once every five to seven instructions, a branch history table may be very large.

Figure 2:
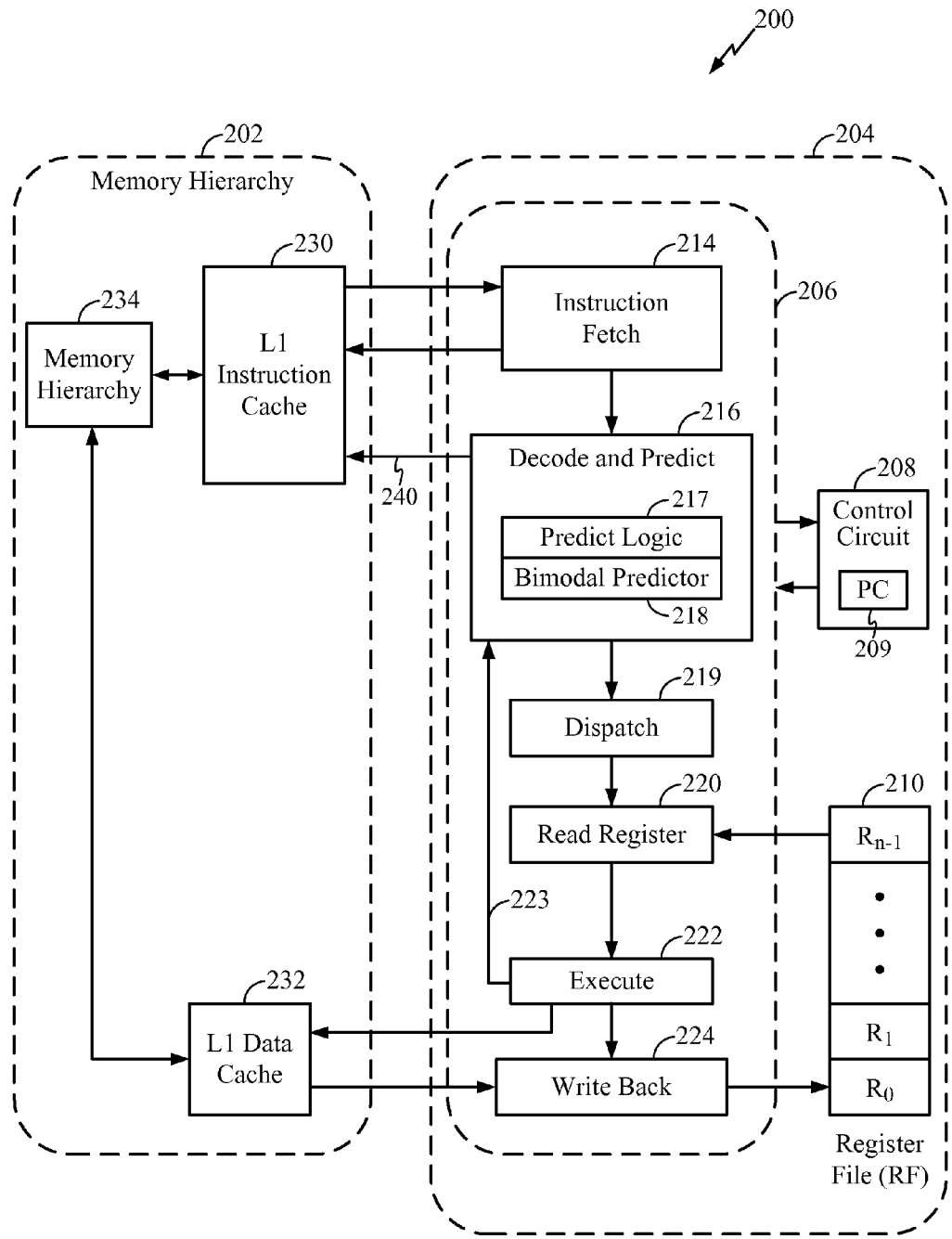
FIG. 2 is a functional block diagram of a processing complex for storing a bimodal branch predictor encoded in branch instructions stored in a memory hierarchy in accordance with the present invention.

FIG. 2 is a functional block diagram of a processing complex 200 for storing a bimodal branch predictor encoded in branch instructions stored in a memory hierarchy 202 in accordance with the present invention. The processor complex 200 includes the memory hierarchy 202 and a processor 204 having a processor pipeline 206, a control circuit 208, and a register file (RF) 210. The memory hierarchy 202 includes a level 1 instruction cache (L1 Icache) 230, a level 1 data cache (L1 Dcache) 232, and a memory system 234. The control circuit 208 includes a program counter (PC) 209. Peripheral devices which may connect to the processor complex are not shown for clarity of discussion. The processor complex 200 may be suitably employed in hardware components 125A-125D of FIG. 1 for executing program code that is stored in the L1 Icache 230, utilizing data stored in the L1 Dcache 232 and associated with the memory system 234, which may include higher levels of cache and main memory. The processor 204 may be a general purpose processor, a multi-threaded processor, a digital signal processor (DSP), an application specific processor (ASP) or the like. The various components of the processing complex 200 may be implemented using application specific integrated circuit (ASIC) technology, field programmable gate array (FPGA) technology, or other programmable logic, discrete gate or transistor logic, or any other available technology suitable for an intended application.

The processor pipeline 206 includes, for example, six major stages: an instruction fetch stage 214, a decode and predict stage 216 having a predict logic circuit 217 and a bimodal predictor circuit 218, a dispatch stage 219, a read register stage 220, an execute stage 222, and a write back stage 224. Though a single processor pipeline 206 is shown, the processing of instructions using the memory hierarchy 202 and decode and predict stage 216 of the present invention is applicable to superscalar designs and other architectures implementing parallel pipelines. For example, a superscalar processor designed for high clock rates may have two or more parallel pipelines supporting multiple threads and each pipeline may divide the instruction fetch stage 214, the decode stage 216, the dispatch stage 219, the read register stage 220, the execute stage 222, and the write back stage 224 into two or more pipelined stages increasing the overall processor pipeline depth in order to support a high clock rate. Also, for design, implementation, or other reasons, the predict logic circuit 217 and the bimodal predictor circuit 218 may be located elsewhere in processor 204, such as in the control circuit 208, for example.

Beginning with the first stage of the processor pipeline 206, the instruction fetch stage 214 associated with a program counter (PC) 209, fetches instructions from the L1 Icache 230 for processing by later stages. If an instruction fetch misses in the L1 Icache 230, meaning that the instruction to be fetched is not in the L1 Icache 230, the instruction is fetched from the memory system 234 which may include multiple levels of cache, such as a level 2 (L2) cache, and main memory. Instructions may be loaded to the memory system 234 from other sources, such as a boot read only memory (ROM), a hard drive, an optical disk, or from an external interface, such as a network. A fetched instruction then is decoded in the decode stage 216.

The dispatch stage 219 takes one or more decoded instructions and dispatches them to one or more instruction pipelines. The read register stage 220 fetches data operands from the RF 210. The execute stage 222 executes the dispatched instruction and the write-back stage 224 writes the result to the RF 210. Result operands from the execution stage 222 may take multiple execution cycles to determine a condition used by a conditional branch instruction. During these cycles, the processor pipeline 206 must wait until the result operand is available. Since results may be received in the write back stage 224 out of order compared to the program order, the write back stage 224 uses processor facilities to preserve the program order when writing results to the RF 210.

The processor complex 200 may be configured to execute instructions under control of a program stored on a computer readable storage medium. For example, a computer readable storage medium may be either directly associated locally with the processor complex 200, such as may be available from the L1 Icache 230, for operation on data obtained from the L1 Dcache 232, and the memory system 234 or through, for example, an input/output interface (not shown). A conditional branch instruction (Cbranch) fetched from the L1 Icache 230 is received in the instruction fetch stage 214. Bimodal prediction bits dynamically stored with the Cbranch in the L1 Icache 230 are retrieved and used in the decode and predict stage 216 to predict whether the fetched conditional branch instruction is to be taken or not-taken. Further instructions may be speculatively fetched based on the prediction. When the Cbranch is in the execute stage 222, the condition is determined and the bimodal predictor circuit 218 is informed over predict signal 223 to make forward transitions of the state of the bimodal predictor if the Cbranch is taken and to make reverse transitions of the state of the bimodal predictor if the Cbranch is not taken. The updated state of the bimodal predictor circuit 218 is then passed over bimodal bit signal 240 to store the bimodal prediction bits in the associated Cbranch at a next available write cycle in the L1 Icache 230. The changed bimodal branch predictor bits in the stored Cbranch instruction affect a prediction of a next branch target address the next time the Cbranch instruction is fetched without affecting the function of the Cbranch instruction. A more detailed description of the processor pipeline 206 using the L1 Icache 230 and decode and predict stage 216 is provided below with detailed code examples.

Figure 3:
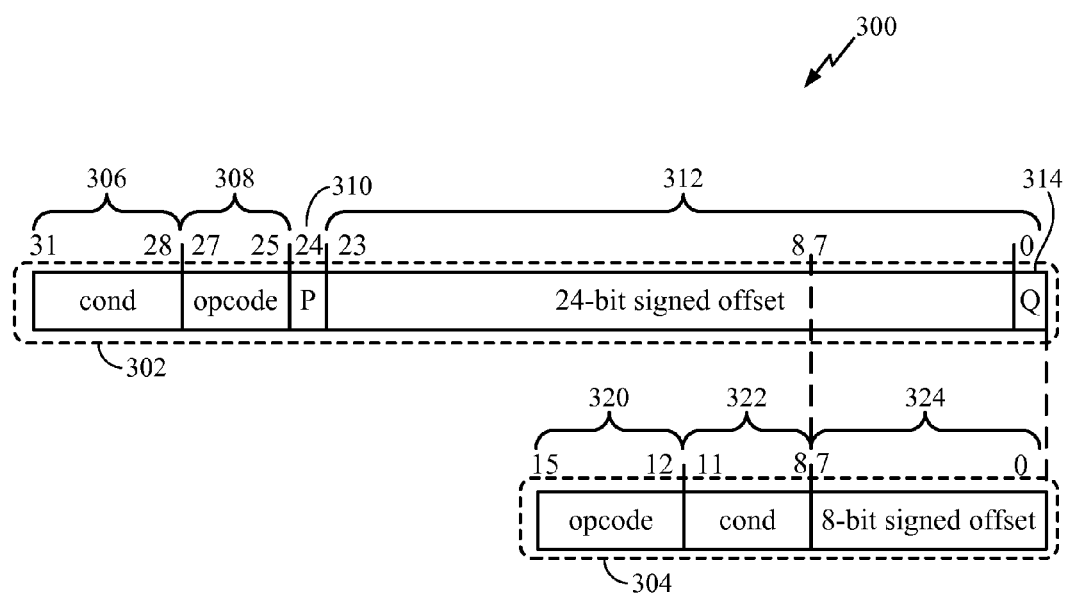
FIG. 3 illustrates exemplary 32-bit and 16-bit conditional branch instructions format supporting dynamic encoding of bimodal branch predictor bits in accordance with the present invention.

FIG. 3 illustrates exemplary 32-bit and 16-bit conditional branch instruction formats 302 and 304, respectively, supporting dynamic encoding of bimodal branch predictor bits in accordance with the present invention. The 32-bit conditional branch instruction format 302 includes a first condition code selection field 306, a first opcode 308, a predict bit 310, a 24-bit signed offset 312, and a Q bit 314. The 16-bit conditional branch instruction format 304 includes a second opcode 320, a second condition code selection field 322, and an 8-bit signed offset 324 for identifying addresses of 16-bit instructions on half-word address boundaries.

Predict bits in conditional branch instructions, such as the predict bit 310, are statically determined prior to loading a program. For example, a backward branch, as determined from the 24-bit signed offset field 312 of the backward branch instruction may be predicted by a compiler as "taken", by asserting the P bit 310 to a one value. With a finite state machine implementation of the bimodal predictor circuit 218, the Q bit 314 may be set to a one value to indicate a strong prediction. Alternatively, the Q bit 314 may be set to a zero value to indicate a weak prediction. An initial or default setting for the Q-bit 314 may be zero, for example. In an alternative embodiment, both of the bimodal predictor bits may be statically determined by an analysis of a program and specified in the branch instruction prior to executing the program. For example, in a program context with a condition branch (Cbranch) instruction used as a loop back function, the P bit 310 may be set to a "1" and the Q bit 314 may be set to "0" indicating a weakly taken state. On the first cycle through the loop, the Cbranch instruction would most likely be predicted as taken and would also most likely be evaluated as taken. The evaluation of taken would cause the bimodal predictor circuit to advance to a "11" strongly taken state.

With a 2 bit saturating counter implementation of the bimodal predictor circuit 218, a taken or not taken prediction may be determined by examining the most significant bit (MSB) of the 2 bit saturating counter output. The strength or confidence of the prediction may be made by examining both bits of the counter value. For example, an exclusive or not ($\neg$ XOR) of the 2 bit saturating counter output provides a binary indication of the strength of the prediction, where a "1" indicates a strong prediction and a "0" indicates a weak prediction. By using the weighted prediction values of the 2 bit saturating counter as described above, the desired state such as a weakly predicted taken state of "10" or a weakly predicted not taken state of "01" may be chosen and initially set in the conditional branch instruction prior to loading the program. Both bits of the bimodal predictor circuit 218 are examined to determine a change of state of the weighted prediction value.

The predict bit 310 and the Q bit 314 are dynamically determined by a most significant bit (MSB) and a least significant bit (LSB), respectively, of a bimodal predictor circuit associated with the conditional branch instruction. The conditional branch instruction may be identified during decode by an encoding of the first opcode 308. The Q bit 314 is located at bit-0 position of the 32-bit conditional branch instruction format 302. The bit-0 position of an address is generally used in a processor having 16-bit and 32-bit instructions to identify a 16-bit instruction on half-word address boundaries. However, the bit-0 position is not used for addressing purposes in the 32-bit conditional branch instruction format 302, since, by definition, all 32-bit instructions are word aligned and bit-0 represents a 16-bit address bit. Alternatively, a Q bit may be stored for each conditional branch instruction in a separate array, while the predict bit remains stored in the conditional branch instruction.

Figure 4:
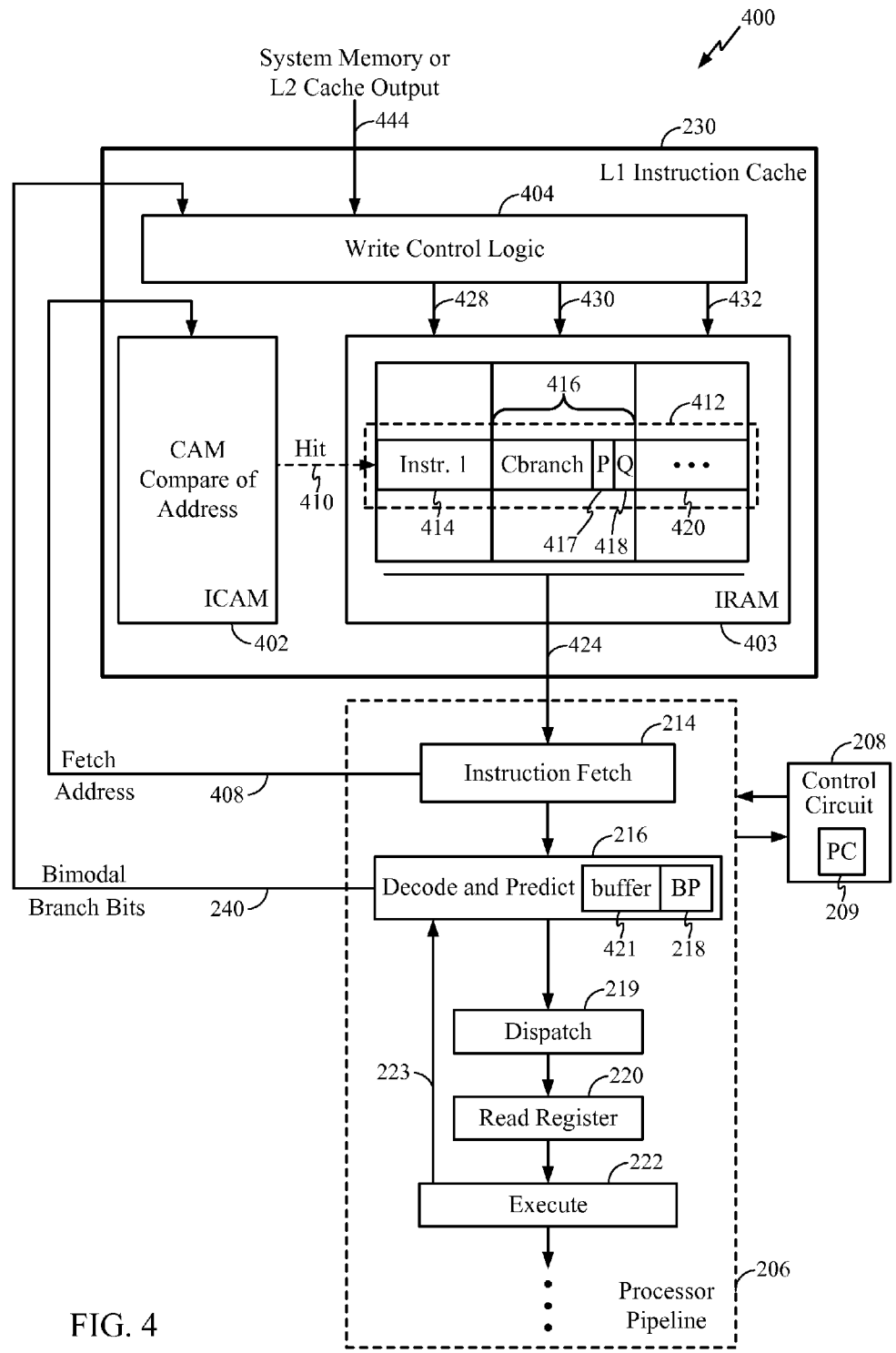
FIG. 4 illustrates an exemplary level 1 instruction cache subsystem coupled to stages of a processor pipeline in accordance with the present invention.

FIG. 4 illustrates an exemplary level 1 instruction cache (L1 Icache) subsystem 400 coupled to stages of a processor pipeline 206 in accordance with the present invention. The L1 Icache subsystem 400 includes the L1 Icache 230 and the multiple stages of the processor pipeline 206. The L1 Icache 230 includes an instruction content addressable memory (ICAM) 402, an instruction random access memory (IRAM) 403, and write control logic 404.

When an instruction is to be fetched, the instruction fetch stage 214 of the processor pipeline 206 issues a fetch address 408 which is received in the ICAM 402 of the L1 Icache 230. The fetch address 408 includes, for example, a cache line address and an offset for the branch instruction position in a cache line addressed by the cache line address. The fetch address 408 is compared to entries in the ICAM 402 to determine if an instruction at the fetch address 408 is to be found in the IRAM 403 of the cache. If a match is determined in the ICAM 402, a hit indication 410 is generated to select a line in the IRAM 403 that is associated with the matching entry in the ICAM 402. For example, an instruction line 412 may be selected that includes a first instruction (Instr. 1) 414, a conditional branch instruction (Cbranch) 416 having a P bit 417 and a Q bit 418, and additional instructions 420.

The selected instruction line 412 is directed to output 424 of the L1 Icache 230 and received in the instruction fetch stage 214. In the next stage of the processor pipeline 206 for the Cbranch 416, the decode and predict stage 216 uses the P bit 417 and Q bit 418 to predict whether the Cbranch 416 is to be taken or not-taken. Based on the prediction, the PC 209 is adjusted accordingly and the instruction fetch stage 214 generates the next fetch address at the taken or not-taken address. The address of the Cbranch 416 and the prediction P bit 417 and Q bit 418 are stored in a pipeline buffer 421 for later examination after condition determination.

The Cbranch 416 continues down the processor pipeline 206, for example, through the dispatch stage 219, the read register stage 220, and reaches the execute stage 222 where the condition is determined. The predict signal 223 informs the decode and predict stage 216 to make a forward transition in the bimodal predictor circuit (BP) 218 if the condition indicates "taken" and make a reverse transitions in the BP 218 if the condition indicates "not-taken". The decode and predict stage 216 then passes the bimodal branch bits selected from the BP 218 over bimodal bit signal 240 to the write control logic 404. If the latest bimodal branch bit values are different from the previous P bit 417 and Q bit 418 values, the write control logic 404 causes the latest P bit and Q bit values to be stored by updating the associated P bit and Q bit values in the Cbranch instruction 416 in the L1 Icache 230. Thus, the previous P bit 417 and previous Q bit 418 values may be replaced. For example, the latest version of the P bit and Q bit may be passed over internal signal 430 to be loaded in the Cbranch position in the instruction line 412. In an alternative approach, the fetched Cbranch instruction updated with the latest version of the P bit and Q bit may be passed over the internal signal 430 to be loaded in the Cbranch position in the instruction line 412. Internal signals 428 and 432 are associated with other instruction positions in an instruction cache line to support the access of conditional branch instructions which may be stored in those locations. If the Icache line has been replaced from the Icache during the time between when a conditional branch instruction is read from the Icache till the point when the branch prediction information is to be written back to the Icache then the branch prediction information is flushed and the cache is not updated.

If the Cbranch instruction is not found in the L1 Icache 230, a miss is indicated and the fetch address is forwarded to the next level memory in the memory hierarchy. For example, a unified level 2 cache (L2 cache) may be used. With a hit in the L2 cache, the Cbranch instruction accessed from the L2 cache is forwarded to the L1 Icache 230 for loading and in parallel forwarded to the instruction fetch stage 214 in the processor pipeline 206. Upon determining updates to the bimodal prediction bits for the Cbranch, the Cbranch in the L1 Icache 230 is dynamically updated with the latest values of the P bit and the Q bit. For example, if the L1 Icache is a single port device, the update of the Cbranch instruction may be stalled if the L1 Icache is fetching instructions which generally has priority over the update. If the L1 Icache is a two port device, the update of the Cbranch instruction may be executed using one port while instructions are being fetched from the Icache using the second port. The branch prediction information is also forwarded to the L2 cache even if the cache line having the Cbranch instruction is present in the L1 Icache. If the L1 line is replaced based on a replacement policy such as a least recently used (LRU), for example, then the next time the line is fetched from the L2 cache the latest prediction information is made available from the stored Cbranch instruction in the L2 cache since the L2 cache line has already been updated. In another approach, when the L1 Icache is updated with branch information, a dirty bit in the tag associated with the instruction line having the Cbranch instruction is set. When the dirty line in the L1 Icache is replaced, then the old dirty line is updated in the L2 cache.

For the exemplary pipeline 206 shown, four bimodal predictor circuits may be located in the decode and predict stage 216 to account for the possibility of four back to back conditional branches in the pipeline. The number of bimodal predictor circuits varies with the depth of the pipeline. For pipelines having a greater depth, greater than four bimodal predictor circuits would be required and depending upon requirements, may implement "n" bimodal predictor circuits where "n" is less than the number supported by the pipeline depth. In such a case, upon receiving an "n+1" conditional branch instruction, such a branch would not have prediction support available and would be stalled. For example, speculative access at a predicted branch target address would be stalled until the branch target address is able to be generated when the condition for the "n+1" branch is determined.

Branch prediction using, for example bimodal counters associated with each conditional branch instruction typically use a prediction logic circuit having a separate branch prediction array to save the bimodal counter bits and a correspondence value for the associated conditional branch instruction. Such a branch prediction array, which is constrained in capacity by circuit requirements, is not required by the present invention. Thus, a hardware circuit implementation in accordance with the present invention is reduced while maintaining the effectiveness of branch prediction. Also, branch prediction as described herein may store bimodal prediction information with each branch instruction and not be limited in capacity by a branch prediction array. Thus, power use is minimized as compared to approaches using a branch prediction array.

Figure 5:
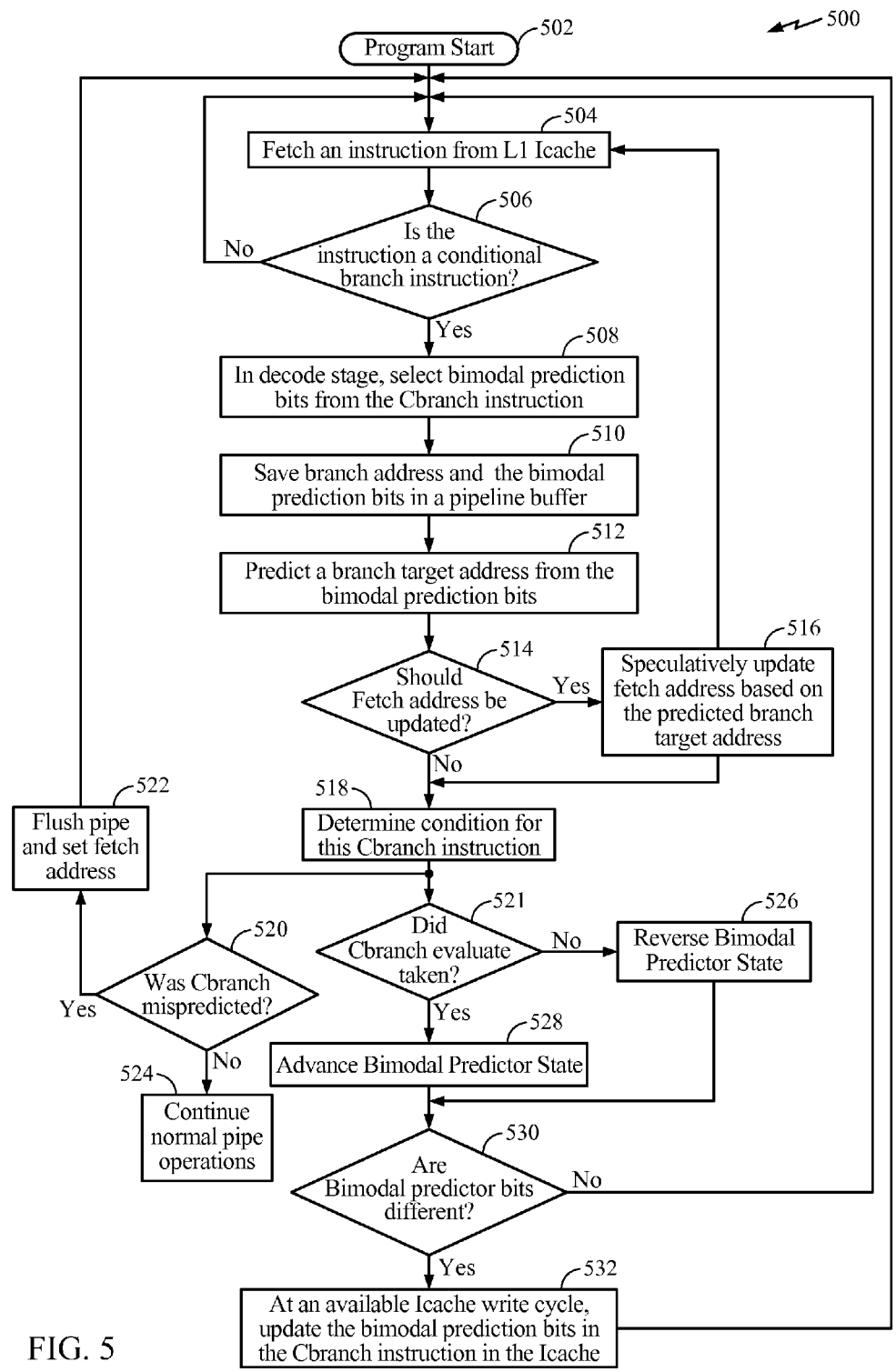
FIG. 5 illustrates a process for reading and writing bimodal branch prediction bits in a branch instruction in the Icache in accordance with the present invention.

FIG. 5 illustrates a process for reading and writing bimodal branch prediction bits in a branch instruction in the Icache in accordance with the present invention. References to previous figures are made to emphasize and make clear implementation details. In a first step 502, a program is started on the processing complex 200. Also, the process 500 follows the path of one conditional branch instruction as it flows through the processor pipeline 206.

At step 504, an instruction is fetched from the L1 Icache 230. At decision step 506, a determination is made whether the fetched instruction is a conditional branch (Cbranch) instruction. If the fetched instruction is not a Cbranch instruction, the process 500 returns to step 504. If the fetched instruction is a Cbranch instruction the process 500 proceeds to step 508.

At step 508, the fetched Cbranch instruction is decoded in the decode and predict stage 216 and bimodal prediction bits are selected from the conditional branch instruction. At step 510, the fetch address of the Cbranch instruction and the selected bimodal prediction bits are saved in the pipeline buffer 421 of FIG. 5. At step 512, a branch target address is predicted based on the bimodal prediction bits. At decision step 514, a determination is made whether the fetch address should be updated. If the fetch address needs to be changed to the predicted branch target address, the process 500 proceeds to step 516. At step 516, the fetch address used in the instruction fetch stage 214 is speculatively updated for fetching an instruction at step 504 based on the predicted branch target address and the process 500 proceeds to step 518. Returning to decision step 514, if the fetch address does not need to be changed, the process 500 proceeds to step 518.

At step 518, the condition for the Cbranch instruction is determined, for example, at the execute stage 222 and the process 500 proceeds in parallel to decision steps 520 and 521. The condition determined at step 518 is used for determining bimodal branch prediction accuracy. At decision step 520, a determination is made whether the Cbranch instruction was mispredicted. If the Cbranch instruction was mispredicted, the process 500 proceeds to step 522. At step 522, the processor pipeline 206 is flushed and the fetch address is set to the corrected fetch address. If the Cbranch instruction was not mispredicted, the process 500 proceeds to step 524. At step 524, the process pipeline 206 continues with normal pipe operations.

At decision step 521, a determination is made whether the condition indicates the Cbranch instruction evaluated taken. If the Cbranch instruction did not evaluate taken, in other words, it evaluated as not taken, the process 500 proceeds to step 526. At step 526, the bimodal predictor circuit is adjusted in a reverse direction, with the prediction value saturating at a bimodal prediction value of "00" and the process 500 proceeds to decision step 530. Returning to decision step 520, if the Cbranch instruction evaluated as taken, the process 500 proceeds to step 528. At step 528, the bimodal predictor circuit is adjusted in a forward direction, with the prediction value saturating at bimodal prediction value of "11" and the process 500 proceeds to decision step 530.

At decision step 530, a determination is made whether the bimodal predictor circuit bits are different from the bimodal prediction bits selected from the fetched Cbranch instruction. If the bimodal predictor circuit bits are the same as the bimodal prediction bits selected from the fetched Cbranch instruction, the process 500 proceeds to step 504. If the bimodal predictor circuit bits are different from the Cbranch instruction's bimodal prediction bits, the process 500 proceeds to step 532. At step 532, the bimodal prediction bits stored with the Cbranch instruction in the L1 Icache are updated at an available Icache write cycle. The process 500 then proceeds to step 504.

The methods described in connection with the embodiments disclosed herein may be embodied in a combination of hardware and in a software module storing non-transitory signals executed by a processor. The software module may reside in random access memory (RAM), flash memory, read only memory (ROM), electrically programmable read only memory (EPROM), hard disk, a removable disk, tape, compact disk read only memory (CD-ROM), or any other form of storage medium known in the art. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques.

While the invention is disclosed in the context of illustrative embodiments for use in processor systems it will be recognized that a wide variety of implementations may be employed by persons of ordinary skill in the art consistent with the above discussion and the claims which follow below. The present technique is scalable to all levels of a memory hierarchy, including level 3 caches and main memory. Also, the conditional branch instruction may be combined with a compare instruction in a single compare branch instruction. The single compare branch instruction includes the bimodal branch prediction bits in an instruction format of the compare branch instruction. For example, unused bits in the instruction formats may be used for the bimodal branch prediction bits. Further, the conditional branch instruction may be combined with a load instruction in a single load and branch instruction which also includes the bimodal branch prediction bits.

What is claimed is:

1. A method of storing bimodal branch predictor bits in a branch instruction in an instruction cache, the method comprising:
   predicting a branch target address based on bimodal branch predictor bits stored in a branch instruction fetched from an instruction cache;
   determining whether to change the bimodal branch predictor bits based on an evaluation of branch prediction accuracy in response to execution of the branch instruction; and
   storing in the instruction cache bimodal branch predictor bits that have changed from the bimodal branch predictor bits in the fetched branch instruction;
   wherein a least significant bit of the bimodal branch predictor bits indicates a strong or weak prediction and the least significant bit of the bimodal branch predictor bits is assigned to a bit position in a 32-bit branch instruction that is not used to specify an operation of the 32-bit branch instruction, and wherein a corresponding bit position in a 16-bit branch instruction is used to specify an operation of the 16-bit branch instruction.

2. The method of claim 1, wherein the bimodal branch predictor bits are bits from a bimodal predictor circuit indicating a strongly taken, a weakly taken, a weakly not taken, and a strongly not taken branch prediction indication.

3. The method of claim 1, wherein the bimodal predictor bits are statically determined by an analysis of a program and specified in the branch instruction loaded in memory prior to executing the program.

4. The method of claim 1, further comprising:
   saving the instruction fetch address in pipeline stages after the branch instruction has been fetched, wherein the instruction fetch address is a cache line address and an offset for the branch instruction position in a cache line addressed by the cache line address; and
   selecting the saved cache line address and offset in the cache line as the instruction fetch address for storing the changed bimodal branch prediction bits.

5. The method of claim 1, wherein the instruction cache is a level 1 instruction cache.

6. The method of claim 1, further comprising;
   updating a level 2 instruction cache with the branch instruction having the changed bimodal branch predictor bits.

7. The method of claim 1, wherein the changed bimodal branch predictor bits in the stored branch instruction affect a prediction of a next branch target address the next time the branch instruction is fetched without affecting the function of the branch instruction.

8. The method of claim 1, wherein the changed bimodal branch predictor bits are stored in the instruction cache by storing the branch instruction having the changed bimodal branch predictor bits.

9. A branch prediction apparatus comprising:
   an instruction cache configured for storing and providing a branch instruction at an instruction fetch address, the branch instruction having bimodal branch predictor bits;
   pipeline storage configured for saving the instruction fetch address of the branch instruction;
   a prediction circuit configured for determining whether to change the bimodal branch prediction bits based on an evaluation of a condition associated with the provided branch instruction; and
   a write control logic circuit configured for storing, in the branch instruction at the saved instruction fetch address in the instruction cache, the bimodal branch prediction bits that have changed from the bimodal branch prediction bits in the provided branch instruction;
   wherein a least significant bit of the bimodal branch predictor bits indicates a strong or weak prediction and the least significant bit of the bimodal branch predictor bits is assigned to a bit position in a 32-bit branch instruction that is not used to specify an operation of the 32-bit branch instruction, and wherein a corresponding bit position in a 16-bit branch instruction is used to specify an operation of the 16-bit branch instruction.

10. The branch prediction apparatus of claim 9, wherein the write control logic circuit further stores at the saved instruction fetch address in the instruction cache the branch instruction having the bimodal branch prediction bits that have changed from the bimodal branch prediction bits in the fetched branch instruction.

11. The branch prediction apparatus of claim 9, wherein a compare instruction combined with the branch instruction is a compare and branch instruction.

12. The branch prediction apparatus of claim 9, wherein a load instruction combined with the branch instruction is a load and branch instruction.

13. The branch prediction apparatus of claim 9, wherein the branch prediction circuit further comprises:
   a two bit counter having states of strongly taken, weakly taken, weakly not taken, and strongly not taken, the two bit counter configured to be incremented for each taken branch saturating at a binary count of three representing strongly taken and decremented for each not taken branch saturating at binary count of zero representing strongly not taken, wherein an exclusive or not (NOT XOR) of the two bit counter states provides the least significant bit of the bimodal branch predictor bits.

14. A method for bimodal branch prediction, the method comprising:
   dynamically generating branch prediction bits associated with a conditional branch instruction during execution; and
   storing the dynamically generated branch prediction bits in the conditional branch instruction in an instruction cache;
   wherein a least significant bit of the bimodal branch predictor bits indicates a strong or weak prediction and the least significant bit of the bimodal branch predictor bits is assigned to a bit position in a 32-bit branch instruction that is not used to specify an operation of the 32-bit branch instruction, and wherein a corresponding bit position in a 16-bit branch instruction is used to specify an operation of the 16-bit branch instruction.

15. The method of claim 14, further comprising:
   making a forward transition between a current state and a next state of weighted prediction values moving toward a saturating strongly taken state if the conditional branch instruction evaluates taken; and
   making a reverse transition between the current state and a next state of the weighted prediction values moving toward a saturating strongly not taken state if the conditional branch instruction evaluates not taken.

16. The method of claim 15, wherein the current state and the next state of the weighted prediction values are states of a finite state machine predictor that represent a strongly taken, weakly taken, weakly not taken, and strongly not taken history of executing the conditional branch instruction.

17. The method of claim 14, further comprising:
adjusting a bimodal prediction circuit based on a taken or not taken resolution of a condition specified by the conditional branch instruction; and
dynamically determining to not update the branch prediction bits stored with the conditional branch instruction when the branch prediction bits represented by the bimodal prediction circuit are the same as the bimodal prediction bits decoded from the conditional branch instruction.

18. The method of claim 14, wherein the branch prediction bits are initially set to a most significant bit of 1 and a least significant bit of 0, indicating a weakly taken state of a bimodal prediction circuit.

19. The method of claim 14, further comprising:
saving the address of the conditional branch instruction and the branch prediction bits in a temporary buffer;
comparing the saved branch prediction bits with a bimodal prediction circuit value that is adjusted based on a taken or not taken resolution of a condition specified by the conditional branch instruction; and
retrieving the saved address of the conditional branch instruction to identify where to store the dynamically determined branch prediction bits.

20. The method of claim 14 further comprising:
predicting a fetched conditional branch instruction is to be taken or not taken according to the branch prediction bits retrieved from the fetched conditional branch instruction.

21. The method of claim 20 further comprising:
speculatively fetching instructions based on the prediction.

22. The method of claim 14 further comprising:
predicting the fetched conditional branch instruction is to be taken according to a most significant bit of the branch prediction bits having a taken state and the least significant bit of the branch prediction bits having a weak prediction, wherein the branch prediction bits are retrieved from the fetched conditional branch instruction.

* * * * *